May 11, 1965  F. L. LE BUS, SR  3,182,961
COMBINED FLEET ANGLE COMPENSATOR AND BRAKING APPARATUS
Filed April 7, 1961  2 Sheets-Sheet 1

INVENTOR.
F. L. LeBus Sr.
BY
C. McKnight
ATTORNEY

May 11, 1965 F. L. LE BUS, SR 3,182,961
COMBINED FLEET ANGLE COMPENSATOR AND BRAKING APPARATUS
Filed April 7, 1961 2 Sheets-Sheet 2

INVENTOR.
F. L. Le Bus Sr.
BY
C. M. McKnight
ATTORNEY

United States Patent Office 3,182,961
Patented May 11, 1965

3,182,961
COMBINED FLEET ANGLE COMPENSATOR AND BRAKING APPARATUS
Franklin L. Le Bus, Sr., Longview, Tex., assignor to Le Bus Royalty Company, Longview, Tex., a partnership
Filed Apr. 7, 1961, Ser. No. 101,443
9 Claims. (Cl. 254—175)

This invention relates to improvements in cable spooling apparatus and more particularly, but not by way of limitation, to a combined automatic cable reeving compensator and drum brake apparatus designed and constructed for installation in a relatively small area for compensating for and correcting the fleet angle of the cable when the fleet angle of the cable winding onto or off the drum is a detriment to the good even spooling of the cable and for automatically braking the rotation of the cable spooling drum when the cable or wire line is not in power or under load tension whereby the cable may be spooled onto the drum efficiently and evenly without distortion or entangling of the cable during the winding operation.

The convenience and advantages of portable hoisting equipment which may be readily moved from job to job has resulted in the widespread use of such portable equipment. The portable equipment, however, has created many problems in the industry in that the design of the portable hoisting equipment normally provides a minimum of space for the frame, the power equipment, the mast, and the cable spooling drums. In addition, due to the relatively short length of the mast, although the fast line cable sheave is usually disposed at or near the top of the mast, the sheave is closer to the cable spooling drum than is the case with larger equipment, and there is usually little regard given to the fleet angle of the cable as it is being spooled onto the hoisting drum. As a result, the fleet angle is frequently bad and is a detriment to the spooling operation. When the cable drum is disposed in relatively close quarters, it is difficult to utilize any of the fleet angle control apparatus available today for overcoming the distortion or entangling of the cable which usually results when the fleet angle is bad. Furthermore, the space limitation, particularly in the portable hoisting equipment, makes it difficult to provide the usual type of braking apparatus in present day use for controlling the slack line when the tension of the line is taken off, and at the same time, set a brake to stop a free-wheeling drum.

Cable having a bad fleet angle from the stationary sheave to the drum core has a tendency to wind unevenly on the core of the drum, which results in a jerking and tangling of the cable as it is unspooled. This is a particular disadvantage in a hoisting or cable winding operation wherein a relatively short mast is utilized with a relatively long spooling drum. Under this type of circumstance, the fleet angle of the cable between the fixed sheave and the drum is usually extremely excessive or bad, and it is often difficult to compensate for the angle to maintain a control of the spooling operation. In addition, it is important that each layer of the cable extend across the drum core from flange to flange with each successive wrap or turn of each layer of the cable being disposed in a close relationship to the adjacent wrap without piling up or laying on top of each other in the proximity of the flange, or pile up in the middle or either side of the drum core between the flanges. It is difficult to control the winding of the cable with the successive turns close together, particularly in well bore drilling operations wherein the load on the cable frequently causes a twisting of the cable. If the initial layer of cable is inefficiently wound on the drum, and the fleet angle is bad, the error will be increased with each successive layer until the control of the cable will be substantially lost.

The spooling of multiple layers of cable onto the drum core has also presented a problem to the hoisting industry. A counter-balance spooling system for providing a true and efficient winding of multiple layers of cable has been developed as disclosed in several of my prior patents, such as United States Letters Patent No. 2,620,996, issued December 9, 1952, and entitled "Cable Winding Apparatus"; No. 2,708,080, issued May 10, 1955, and entitled "Hoisting Drum"; No. 2,732,150, issued January 24, 1956, and entitled "Balanced Cable Spooling"; and No. 2,734,695, issued February 14, 1956, and entitled "Balanced Cable Spooling." The spooling system developed by the aforementioned patents has greatly advanced the cable spooling art and has met with wide acceptance in hoisting industry of all types. However, an efficient control of the cable can be maintained with the counterbalanced spooling system only if the fleet angle of the cable between the fixed sheave and the drum is contained within certain limits, preferably not greater than approximately one and one-half degrees, but not limited thereto. It has been found that a fleet angle in excess of this size, or greater than one and one-half degrees, creates further problems in the spooling operation in that the line will tend to be pulled up on a preceding wrap and start back on the next layer before the cable reaches the drum flange, or the cable will move two or three grooves toward the center of the drum as soon as it rises at the flange. In either event, there will be voids or gaps in the cable spooled on the drum, which results in an uneven winding on the core of the drum.

Many efforts have been made to improve the efficiency of cable winding operation. Frequently, an operator will stand in the vicinity of the drum as the cable having a bad fleet angle is being spooled thereon, and with the assistance of a crow bar, or the like, will attempt to manually guide the cable and correct or overcome the bad fleet angle, which is obviously inefficient and dangerous. As a result, many devices have been developed for guiding the cable or holding the line spooling onto the drum within the necessary or desirable fleet angle limits. These devices are usually either expensive geared type structures, or are manually operated, with the inherent human errors and inefficiencies. In addition, the presently available reeving structures for this purpose normally provide a considerable amount of friction which must be overcome during the operation thereof, thus greatly reducing the efficiency of operation.

Furthermore, the cable or line being spooled onto the hoisting drum is normally under a constant tension in order that the line may be tightly wound or coiled around the drum core. The tension on the line maintains the line tightly wrapped on the drum at all times. The spooling drum is normally a free wheeling drum, particularly during the unspooling operation, and when the tension on the line is released for any reason, the tightly coiled line tends to unwrap from the drum in a spring-like action to provide a "bird cage" effect around the drum. This is a particular disadvantage in hoisting operations, and the like, wherein the load or tension on the cable may be unexpectedly and suddenly released. Unless the rotation of the drum or hoist winch is stopped immediately with the release of the tension in the line, the slack in the line will move through the line to the drum, and the cable will "bird cage" on the drum whereby the control of the spooling or unspooling thereof will be lost. It will be apparent that the line or cable may kink or become badly entangled with itself during any "bird cage" action thereof on the drum. This accidental uncoiling of the line usually causes a distorted effect in the winding of the line which is highly undesirable. It is, therefore, preferable to provide a braking means for the hoisting drum. However, the space limitation, particularly in the portable hoisting equipment, is frequently such that the presently available braking apparatus cannot be used.

The present invention contemplates a novel combined fleet angle compensating apparatus and drum braking mechanism designed and constructed as an integral pivotal unit for an automatic operation in accordance with the pressure of the wound cable and load tension of the cable to maintain a smooth and even spooling operation. Upon any release of pressure or load tension of the cable, the braking end of the pivotal unit will automatically be set against the cable that is spooled onto the drum to prevent slack line and unreeving of the cable when the drum is not rotating. When the line is again in tension, the braking mechanism is automatically released and the reeving apparatus will respond to the pressure of the cable for eliminating the fleet angle of the line being reeved onto the drum. The friction in the reeving apparatus is reduced to a minimum for an optimum efficiency of control of the cable during the winding operation.

The novel fleet angle compensator appartus is particularly designed to provide a compensation for the fleet angle in both a vertical and horizontal plane. The cable passes over a movable sheave which moves laterally in response to the pressure of the cable whereby the cable is oriented with respect to the drum at the optimum angle therebetween for providing an efficient spooling operation. The present invention may be utilized for controlling the spooling operation, as well as for correcting the fleet angle of the cable. However, it is preferable, but not limited thereto, to utilize the novel apparatus in combination with my counterbalanced spooling system hereinbefore set forth, thus assuring a complete and efficient spooling of the cable.

The movable sheave is interposed between the fixed or slack line control sheave and the drum for receiving the cable therearound, and is carried by an eccentric shaft. The floating sheave is movable along the shaft in response to the pressure of the cable whereby the shaft is rocked or oscillated in an eccentric motion with respect to the longitudinal axis thereof. The automatic eccentric movement of the shaft combined with the lateral movement of the sheave therealong provides an arcuate path of motion for the center line of the sheave as the cable is wound or unwound from the drum. This arcuate movement of the floating sheave maintains the length of the cable between the fixed sheave and the drum substantially constant throughout the spooling operation and compensates for the fleet angle between the floating sheave and the drum. This action of maintaining the length of the cable constant between the fixed sheave and the drum is the important feature of the efficient compensation of the fleet angle, and results in a substantially perpendicular path for the cable with respect to the axis of the drum as the cable leaves the drum or, in other words, maintains the portion of the cable between the drum and the movable sheave parallel with the plane of the drum flanges throughout the spooling operation. This substantial elimination of the fleet angle results in a greatly increased efficiency of the cable spooling operation. However, it is to be noted that the reeving apparatus or fleet angle compensator apparatus is not intended to be a cable spooling device in itself. The true and efficient spooling provided by my aforementioned counterbalanced spooling system is desirable to provide for the overall efficient results of the fleet angle compensator apparatus. The compensator apparatus will function to correct the fleet angle with substantially any cable spooling operation, but the end results of efficiently spooled cable on a drum will be only as true as the cable spooling device utilized therewith. Thus, it is important that the fleet angle compensator apparatus be utilized with a counterbalanced spooling operation for optimum efficiency thereof in cable winding in all hoisting operations.

The braking portion of the novel combined apparatus will automatically function to hold the cable or line in the grooves of the hoisting drum or in the grooves on top of the preceding layer of the line when the load tension on the line is released and thus assures that the complete layer of the line, or any part thereof will be even and uniform. My counterbalance spooling system has a particular pattern known as a combination of parallel and pitch control groove sections which provides that the parallel section of wraps and the cross-over sections on multilayer spooling will be in a uniform and even pattern at the pitch control section, as well as at the parallel section of wraps. If one wrap of line in a complete layer of line across the drum is higher than the additional wraps, then the additional wraps will not be contacted by the brake and will tend to slacken and unreeve. Thus, in multilayer spooling operations, it is desirable to utilize my counterbalance grooved spooling system in combination with the braking apparatus. However, substantially any kind of helical grooved drum may be successfully utilized with the present novel automatic compensator and braking mechanism when only one layer of line is being spooled onto or off the drum during the hoisting operation.

It is an important object of this invention to provide a novel combined reeving apparatus and braking mechanism for compensating for and controlling the fleet angle during the spooling of a line onto a drum and for automatically braking the rotation of the drum upon a slackening of the line to preclude accidental unreeving of the cable from the drum.

It is another object of this invention to provide a novel combined pivotal reeving apparatus and braking mechanism particularly designed and constructed for maintaining a substantially constant length for the cable between the fixed sheave and the drum throughout the spooling or unspooling operation and automatically responsive to a release in the tension of the line for setting the braking mechanism to preclude accidental unreeving of the cable from the drum.

Another object of this invention is to provide a novel combined fleet angle compensator apparatus and braking mechanism particularly designed and constructed for disposition in a relatively limited space or area.

A further object of this invention is to provide a novel combined fleet angle compensator apparatus and braking mechanism for automatically compensating for both vertical and horizontal movement of the cable wherein the braking mechanism will automatically operate regardless of the movement of the fleet angle compensator apparatus.

A still further object of this invention is to provide a novel combined fleet angle compensator apparatus and braking mechanism for automatically maintaining the cable substantially perpendicular to the axis of the drum without effecting the automatic operation of the braking mechanism.

Still another object of this invention is to provide a novel fleet angle compensator and braking apparatus which may be adjusted for compensation of any misalignment of the field installation of the equipment with which the apparatus is to be utilized whereby the fleet angle and braking will be corrected accordingly.

A still further object of this invention is to provide a combined fleet angle compensator and braking apparatus wherein the friction from a bad fleet angle during the operation thereof is reduced to a minimum for greatly increasing the efficiency thereof during the spooling operation and wherein the braking apparatus retains the cable tight against the drum to prevent slack cable unreeving when the operation is stopped and the cable tension is relaxed.

Another object of this invention is to provide a fleet angle compensator braking unit apparatus for automatically correcting a bad fleet angle and automatically holding the cable in the spooling groove and braking the rotation of the drum in response to the release of load tension in the cable wherein the operation thereof is completely independent of manual attention.

A still further object of this invention is to provide a novel combined fleet angle compensator apparatus and braking mechanism which is simple and efficient in operation and economical and durable in construction.

Other objects and advantages of the invention will be evident from the following detailed description, read in conjunction with the accompanying drawings, which illustrate my invention.

Figure 1:
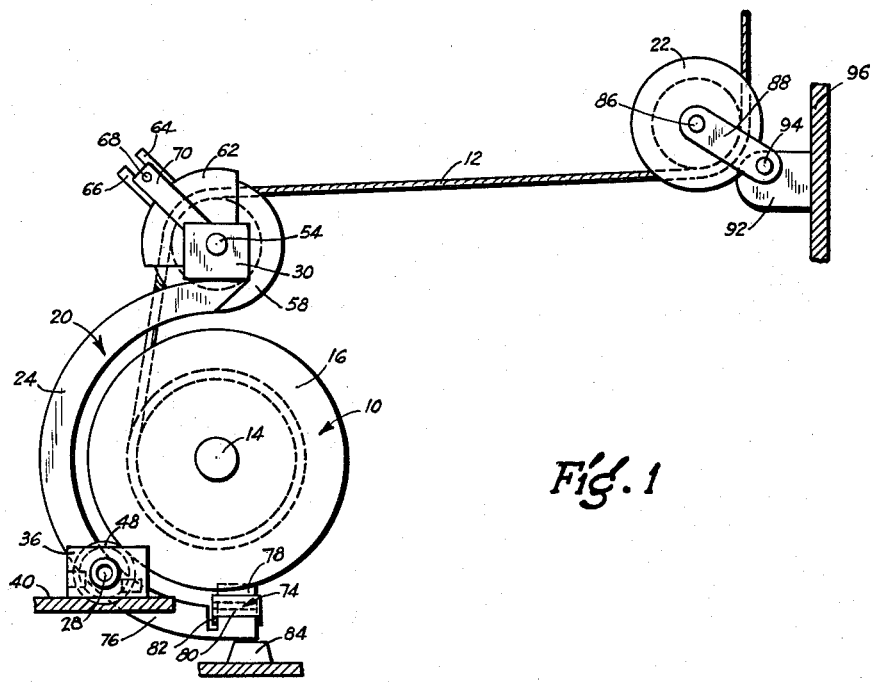
FIGURE 1 is a side elevational view of a fleet angle compensator apparatus and braking mechanism embodying the invention, and depicting the cable spooling drum and fixed sheave with the line in tension.

Referring to the drawings in detail, reference character 10 generally indicates a cable spooling drum or winch having a cable 12 spooled thereon. The drum 10 may be journalled on a suitable shaft 14 for rotation, and is provided with opposed end flanges 16 and 18, as is well known. It is preferable that the drum 10 be provided with a core (not shown) having a plurality of cable receiving grooves (not shown) on the outer periphery thereof to facilitate the winding or spooling of the first layer or wrap of the cable 12 onto the drum 10, as is well known in the industry, and as set forth in my counterbalance spooling patents heretofore described. However, it is to be noted that any suitable drum or winch may be utilized with the invention.

A combined fleet angle compensator and braking apparatus, generally indicated at 20, is secured in juxtaposition to the drum 10, as will be hereinafter set forth, and is interposed between the drum 10 and a fixed position or slack line control sheave 22. The cable 12 extends from the drum 10, through the reeving and braking apparatus 20, around the sheave 22, and thence to the load (not shown) being manipulated thereby. The sheave 22 may be journalled for rotation in any well known manner as will be hereinafter set forth, and is normally spaced from the drum as clearly shown in FIGS. 1, 2 and 3 in such a manner that the sheave 22 is substantially centrally disposed between the drum flanges 16 and 18. However, there are many installations in which the sheave 22 is disposed to either one side or the other with respect to the drum 10, and the combined fleet angle compensator and braking apparatus 20 may be adjusted to correct for any misalignment or off-set installation of the sheave 22.

The combined fleet angle compensator and braking apparatus comprises a pair of spaced oppositely disposed arcuate support arms 24 and 26, each having one end secured to a rotatable shaft 28. A pair of pillow block bearings 30 and 32 are secured to the opposite ends of the arms 24 and 26, respectively, for journalling an eccentric shaft 34 therebetween. The opposed ends of the shaft 28 are supported by suitable pillow block bearings 36 and 38 which may be secured or mounted on any suitable base or structure member 40. A torsion spring 42 is disposed around one end of the shaft 28 and is interposed between the pillow block 38 and the arm 26. One end of the spring 42 is anchored to the pillow block 38 by a suitable stop member 44 and the opposite end thereof is anchored to the arm 26 by suitable stop member 46. A second torsion spring 48 is disposed around the opposite end of the shaft 28 and interposed between the pillow block 36 and the arm 24. One end of the spring 48 is anchored to the pillow block 36 by a suitable stop member 50 and the opposite end thereof is anchored to the arm 24 by a suitable stop member 52. The springs 42 and 48 constantly urge the shaft 28 for rotation in a counterclockwise direction, as viewed in the drawings, for a purpose as will be hereinafter set forth.

The eccentric shaft 34 may be of any suitable type and is preferably journalled between the pillow block bears 30 and 32 by aligned shaft members 54 and 56. The axis of rotation of the aligned shafts 54 and 56 is angularly disposed and offset from or non-coplanar with respect to the longitudinal axis of the shaft 34, and this results in an eccentric rocking motion for the shaft 34 during the spooling operation. A floating sheave or pulley 58 is journalled on the shaft 34 for receiving the cable 12 therearound and is transversely movable therealong in response to the pressure of the cable 12 being spooled onto or unspooled from the drum 10. The sheave 58 may be journalled on the shaft 34 in any suitable manner, such as a bearing member 60 (FIG. 4) which may be disposed on the shaft 34 in any well known manner and is rotatable thereon as well as movable therealong.

A suitable sheave guard member 62 may be carried by the bearing member 60, if desired, for precluding accidental dislodging of the cable 12 from the engagement with the sheave 58. A pair of spaced guide members 64 and 66 may be secured to the outer periphery of the sheave guard 62 for receiving a bar 68 therebetween. The opposite ends of the bar 68 are secured to suitable support members 70 and 72 which are in turn supported by the pillow block bearings 30 and 32, respectively. The bar 68 and guides 64 and 66 cooperate for guiding the sheave cover or guard 62 as the sheave 58 moves longitudinally along the shaft 34.

Figure 4:
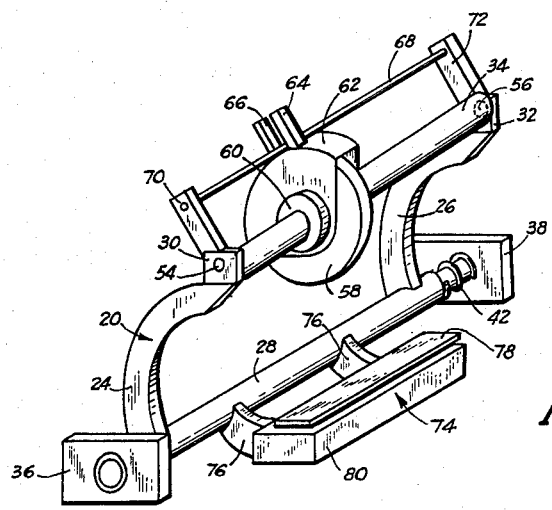
FIGURE 4 is a perspective view of the fleet angle compensator and braking apparatus.

A braking mechanism 74 is secured to the shaft 28 by a pair of suitably spaced support arms 76 and is spaced from the eccentric shaft 34 as clearly shown in FIG. 4. The braking mechanism 74 may be of any suitable type, and is preferably of a construction similar to that disclosed in my co-pending application Serial No. 58,987, filed September 28, 1960, and entitled "Braking Apparatus and Slack Line Control Device." The braking mechanism 74 may be provided with a braking plate member 78 adapted to engage the outer periphery of the cable 12 spooled on the drum 10 in the braking position of the apparatus 20. The braking pad or plate member 78 may be supported by a pair of longitudinally movable block members 80 and 82 which are secured together by a suitable linkage arrangement (not shown) whereby the members 80 and 82 will be moved in opposite longitudinal direction upon engagement of the brake plate 78 with the cable 12. The block members 80 and 82 are thus moved into a braking engagement with the inner face of the drum flanges 16 and 18 for stopping or braking the rotation of the drum. A stop member 84 (FIGS. 1 and 2) is disposed in the proximity of the braking mechanism 74 for limiting the clockwise rotational movement of the apparatus 20.

Figure 2:
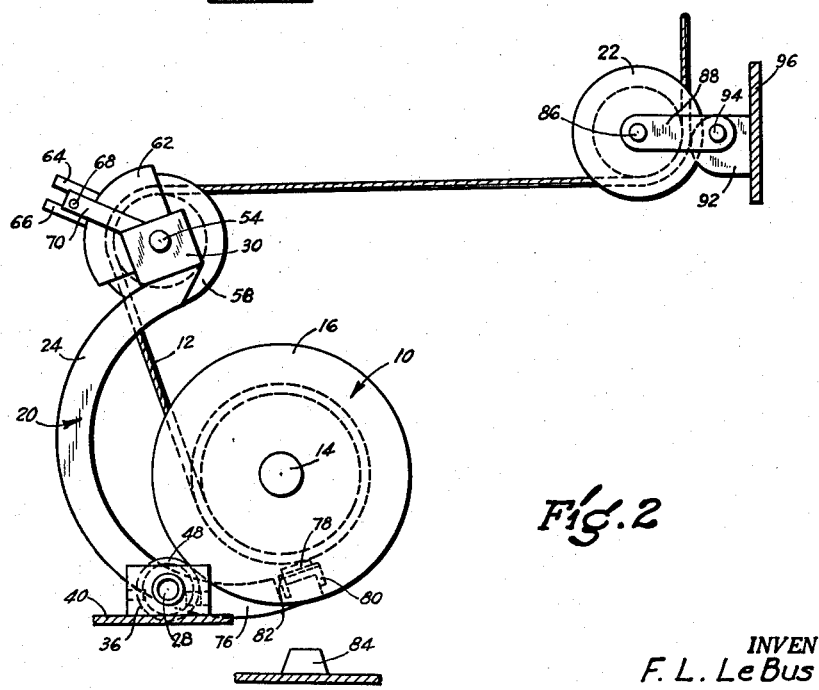
FIGURE 2 is a view similar to FIG. 1 depicting the fleet angle compensator and braking apparatus in the slack line position.
Figure 3:
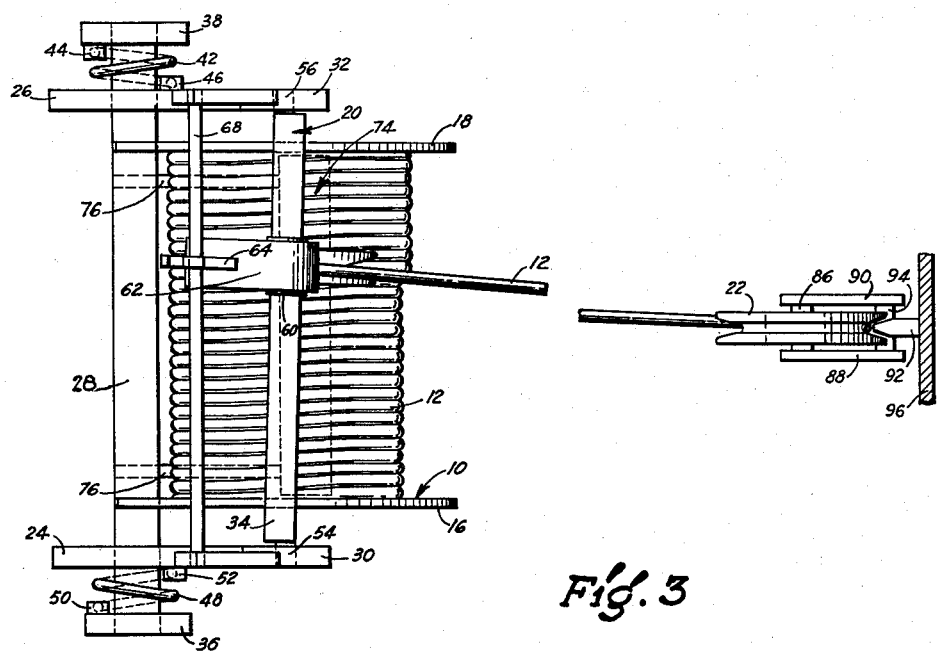
FIGURE 3 is a plan view of the fleet angle compensator apparatus and braking mechanism as depicted in FIG. 1.

The fixed position or slack lime control sheave 22 is journalled on a pin or pivot member 86 extending between a pair of spaced pivot arms 88 and 90 (FIG. 3). The pivot arms 88 and 90 are pivotally secured to a bracket member 92 by a pivot pin 94, and the bracket 92 may be rigidly secured to a suitable support member 96 in any well known manner (not shown). The normal or usual tension in the cable 12 during the spooling or unspooling operation maintains the sheave 22 in a slightly raised position with respect to the bracket 92, as clearly shown in FIG. 1. However, upon a release of the tension in the cable 12, the weight of the sheave 22 causes a downward movement or counter-clockwise rotation thereof around the pivot pin 94, as viewed in the drawings. Simultaneously, the springs 42 and 48 rotate the shaft 28 in a counterclockwise direction for moving the shaft 34 and sheave 58 in a direction away from the sheave 22 to the position shown in FIG. 2. As a result, the cable 12 is clamped between the sheave 22 and the bracket 92, as clearly shown in FIG. 2. This clamping action of the sheave 22 and the bracket 92 in combination with the movement of the sheave 58 in a left hand direction as viewed in the drawings maintains the cable 12 substantially taut between the upper sheave 22 and the drum 10. This substantially precludes any slack in the line or cable 12 being transmitted to the drum 10.

*Operation*

In spooling operations wherein no fleet angle compensator device is utilized in cooperation with the spooling drum, the cable or line 12 will tend to seek the shortest distance from the fixed sheave 22 to the drum. In other words, the line 12 will try to pile up at a point on the drum where a line passing through the sheave 22 is perpendicular to the drum axis. It will be apparent that if the length of the cable 12 between the sheave 22 and the drum 10 is maintained substantially constant at all times during the spooling operation, there will be no preferred position on the drum where the cable will tend to pile up. Thus, the combined fleet angle compensator and braking apparatus 20 is interposed between the fixed sheave 22 and the drum 10 to maintain the length of the cable 12 therebetween substantially constant throughout the spooling and unspooling operation.

During the spooling or unspooling operation, the normal or usual tension in the line 12 acts on the floating sheave 58 and urges the sheave 58 in a direction toward the sheave 22 which causes the shaft 28 to rotate in a clockwise direction against the action of the springs 42 and 48. This causes the apparatus 20 to move to the position shown in FIG. 1. The clockwise rotation of the shaft 28, as viewed in the drawings, maintains the braking mechanism 74 in a disengaged position and the spooling operation may be continued as desired without interference therefrom. The floating sheave 58 moves laterally with respect to the cable 12 and along the shaft 34 in response to the pressure of the cable 12. Any movement of the cable to the left or right of the mean or center point of the drum 10 will cause the compensating or floating pulley 58 to move to either the left or right of the center point in accordance with the direction of the spooling or unspooling of the line or cable. The tension of the cable 12 around the sheave 58 rotates or rocks the shaft 34 about the axis of the aligned pins 54 and 56 for changing the angular position of the shafts 34. As the shaft 34 rocks or oscillates about the axis of the pins 54 and 56 in accordance with the direction of travel of the cable 12, the center line of the sheave 58 moves through an arcuate path.

The eccentric oscillation of the shaft 34 moves the sheave 58 alternately toward and away from the drum 10 and varies the angular disposition of the plane of the sheave 58 whereby the over-all length of the cable 12 between the fixed sheave 22 and the drum 10 is maintained substantially constant at all times. As a result, the cable 12 moving from or to the drum 10 from the sheave 58 remains substantially perpendicular to the longitudinal axis of the drum or parallel with the plane of the drum flanges 16 and 18, thus eliminating the fleet angle, and the inherent disadvantages thereof. The oscillation of the shaft 34 and the lateral movement of the sheave 58 therealong is automatic in response to the tension and pressure of the cable being spooled or unspooled and no manual attention is required.

As hereinbefore set forth, the tension in the cable 12 maintains the apparatus 20 rotated in a clockwise direction with the shaft 28, and simultaneously maintains the slack line control sheave 22 in a raised position with respect to the bracket 92, as shown in FIG. 1. The spooling or unspooling operation may be continued as desired with an automatic control thereof and without interference from the braking mechanism 74. The stop member 84 functions for engaging the braking mechanism 74 to limit the clockwise rotation of the apparatus 20 about the shaft 28 and the action of the springs 42 and 48 for urging the shaft 28 in a counterclockwise direction assures an efficient engagement between the floating sheave 58 and the cable or line 12 during the spooling operation. It will be apparent that any fluctuations or changes of the vertical angle of the cable are automatically compensated for by the rotation of the shaft 28 mounted in the bearings 36 and 38.

Substantially immediately upon the release of the tension in the cable 12, such as when the load (not shown) being manipulated thereby has been dropped onto a solid support, the weight of the slack line control sheave 22 causes the sheave to drop, or rotate in a counterclockwise direction around the pivot pin 94, as viewed in the drawings, to the position depicted in FIG. 2. The cable 12 is securely clamped between the sheave 22 and the bracket 92, not only stopping the movement of the cable, but also cooperating with the left hand movement of the sheave 58 for precluding any slack in the line from being transmitted to the drum 10.

The release of the tension in the cable 12 also permits the apparatus 20 to rotate in a counterclockwise direction with the shaft 28 in response to the action of the springs 42 and 48, and to the position shown in FIG. 2. The counterclockwise rotation of the apparatus 20 moves the braking plate 78 into contact with the outer layer or wrap of the cable 12 on the drum 10, as shown in FIG. 2. The contact of the brake pad 78 with the cable 12 combined with the continued counterclockwise rotation of the apparatus 20 urges the blocks 80 and 82 outwardly into a braking engagement with the drum flanges 16 and 18 for substantially instantaneously stopping the rotation of the drum 10. This sudden stoppage of the rotation of the drum combined with the clamping action of the sheave 22 upon the release of the tension in the cable 12 substantially precludes any "bird cage" action of the cable around the drum. In addition, the pressure of the block member or pad member 78 adjacent the outer layer of the cable on the drum tends to retain the cable tightly coiled around the drum, and prevents one wrap of the cable from overlapping an adjacent wrap.

The braking mechanism 74 will be automatically disengaged from the drum upon a picking up of the tension in the cable 12 such as by picking up a load, or the like. As the tension returns to the cable, the slack line control sheave 22 will be elevated or rotated in a clockwise direction around the pivot 94 for releasing the clamping engagement of the cable. Simultaneously, the sheave 58 will be pulled in a direction toward the sheave 22 for rotating the apparatus 20 in a clockwise direction with the shaft 28. The clockwise rotation of the shaft 28 will move the braking mechanism downwardly and out of engagement with the drum 10 for releasing the braking pressure. This releases the drum 10 for rotation whereby the spooling or unspooling operation may be continued.

By way of summary, the normal or usual tension in the cable 12 during the spooling or unspooling operation maintains the slack line control sheave 22 in a raised position and the pressure of the cable on the movable sheave 58 moves the sheave laterally along the shaft 34. The movement of the sheave 58 along the shaft 34 results in an eccentric oscillation of the shaft 34 which automatically orientates the sheave 58 with respect to the drum 10 for maintaining the cable in a path substantially perpendicular to the longitudinal axis of the drum. When the tension in the line 12 is released or relaxed for any reason, the slack line control sheave 22 will drop downwardly for clamping the cable 12 against the bracket 92. Simultaneously, the pressure of the springs 42 and 48 will rotate the shaft 28 in a counterclockwise direction whereby the sheave 58 is moved in a direction away from the sheave 22 for cooperating therewith to preclude any slack in the line from travelling to the drum. The counterclockwise rotation of the shaft 28 automatically moves the braking mechanism 74 into contact with the outer wrap or layer of the cable on the drum whereby the brake is actuated for a braking engagement with the drum flanges 16 and 18, and the brake pad 78 retains the cable 12 tightly coiled around the drum. Conversely, when the tension in the line 12 is picked up such as picking up a load, the slack line control sheave 22 is raised for releasing the cable 12, and the pressure exerted by the tension in the line picks up the sheave 58 for rotating the apparatus 20 in a clockwise direction against the action of the springs 42 and 48. This clockwise rotation automatically lowers the braking mechanism 74 from the engaged position with the drum, and the spooling or unspooling operation may be continued as desired. The operation of both the fleet angle control sheave 58 and the braking mechanism 74 is completely automatic in response to the tension or pressure in the cable, and no manual attention is required for the apparatus 20.

From the foregoing, it will be apparent that the present invention provides a novel combined fleet angle compensating and braking apparatus wherein the fleet angle of the cable is automatically eliminated in accordance with the tension or pressure of the cable, and the rotation of the cable winding drum or hoisting winch is automatically stopped substantially immediately upon the release of the tension in the cable. The combined apparatus is responsive to the tension of the cable for a completely automatic action, and is particularly designed and constructed for disposition in a relatively limited space or area. The novel combined fleet angle compensating apparatus and braking mechanism is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination with a drum having a cable wound thereon, a fleet angle compensator apparatus disposed in juxtaposition to the drum for receiving the cable, a braking mechanism connected with the fleet angle compensator apparatus, said fleet angle compensator apparatus responsive to tension in and pressure on the cable for maintaining the path of the cable substantially perpendicular to the longitudinal axis of the drum, said braking mechanism responsive to the tension in the cable for alternately engaging and disengaging the cable wound on the dum.

2. In combination with a drum having a cable wound thereon, a fleet angle compensator apparatus disposed in juxtaposition to the drum for receiving the cable, said fleet angle compensator apparatus responsive to tension in and pressure on the cable for automatically maintaining the path of the cable substantially perpendicular to the longitudinal axis of the drum, braking means integrally connected with the fleet angle compensator apparatus and responsive to a release of the tension in the cable for engaging the cable wound on the drum for automatically braking the rotation of the drum, said braking means alternately responsive to a picking up of the tension in the cable for automatically disengaging from cable wound on the drum.

3. In a combined fleet angle compensator apparatus and braking mechanism for cable spooling, a pivotal frame, a fleet angle compensator apparatus carried at one end of the frame, a braking mechanism carried at the opposite end of the frame, said frame pivotal in response to tension in the cable for moving the braking mechanism into alternately engaging and disengaging positions, with the spooled cable, and said fleet angle compensator apparatus responsive to the tension in and pressure on the cable for automatically eliminating the fleet angle during the spooling operation.

4. In a combined fleet angle compensator apparatus and braking mechanism for cable spooling, a pivotal frame, a fleet angle compensator apparatus carried at one end of the frame, a braking mechanism carried at the opposite end of the frame, said fleet angle compensator apparatus comprising an eccentric shaft having an off-set axis of rotation with respect to the longitudinal axis thereof, a sheave journalled on the shaft for receiving the cable and movable along the shaft in response to and pressure on the cable for oscillating said shaft about the axis of rotation whereby the sheave is automatically orientated for eliminating the fleet angle of the cable during the spooling operation, means provided on the frame for urging the frame in a rotational direction against the pull of the cable, said braking mechanism automatically engaged upon rotation of the frame when the tension is relaxed in the cable.

5. In a combined fleet angle compensator and braking apparatus for cable spooling, a pivotal frame, a fleet angle compensator apparatus carried at one end of the frame for receiving the cable and responsive to the tension in and pressure on the cable for automatically eliminating the fleet angle thereof, and a braking mechanism carried at the opposite end of the frame, said braking mechanism automatically engaged with the spooled cable upon a release of the tension in the cable and automatically disengaged from the spooled cable upon a picking up of the tension in the cable.

6. In combination with a drum having a cable wound thereon, a combined fleet angle compensator and braking apparatus comprising a pivotal frame member secured in juxtaposition to the drum, a fleet angle compensator apparatus carried at one end of the frame for receiving the cable, a braking mechanism carried at the opposite end of the frame for alternately engaging and disengaging the cable wound on the drum, means provided in the fleet angle compensator apparatus responsive to the tension in and pressure on the cable for automatically maintaining the path of the cable substantially perpendicular to the longitudinal axis of the drum, and means carried by the frame member for pivoting thereof in a direction for automatically engaging the braking mechanism with the cable wound on the drum upon a release of the tension in the cable.

7. A combined fleet angle compensator and braking apparatus for cable spooling and comprising a rotatable shaft, a pair of spaced arm members carried by the shaft and rotatable therewith, an eccentric shaft spaced from the rotatable shaft and journaled between the arm members, and having an off-set axis of rotation with respect to the longitudinal axis thereof, a sheave journalled on the eccentric shaft for receiving the cable and movable along the eccentric shaft in response to tension in and pressure on the cable for oscillating said eccentric shaft about the axis of rotation whereby the sheave is orientated for automatically eliminating the fleet angle of the cable, a braking mechanism carried by the rotatable shaft and oppositely disposed from the eccentric shaft, resilient means disposed around the rotatable shaft for urging thereof in a rotational direction against the pull of the cable whereby the braking mechanism will be automatically engaged upon a release of the tension in the cable.

8. In combination with a drum having a cable wound thereon, a slack line control sheave, a fleet angle compensator apparatus interposed between the drum and the slack line control sheave for receiving the cable, a braking mechanism integrally connected with the fleet angle compensator apparatus, said fleet angle compensator apparatus responsive to the tension in and pressure on the cable for automatically maintaining the path of the cable substantially perpendicular to he longitudinal axis of the drum during the spooling or unspooling of the cable from the drum, said slack line control sheave responsive to a release of the tension in the cable for automatically stopping the movement of the cable, and said braking mechanism responsive to the release of the tension in the cable for automatically engaging the cable wound on the drum for braking the rotation of the drum and maintaining the cable tightly wound on the drum.

9. In combination with a drum having a cable wound thereon, a slack line control sheave spaced from the drum for receiving the cable therearound, a combined fleet angle compensator and braking apparatus disposed in juxtaposition to the drum and comprising a rotatable shaft, a pair of spaced arm members carried by the shaft and rotatable therewith, an eccentric shaft spaced from the rotatable shaft and journalled between the arm members, a second sheave journalled on the eccentric shaft and interposed between the drum and the slack line control sheave for receiving the cable therearound, said second sheave movable along the eccentric shaft in response to the tension in and pressure on the cable whereby the eccentric shaft will oscillate for orientation of the movable sheave to automatically maintain the path of the cable substantially perpendicular with the longitudinal axis of the drum, a braking mechanism carried by the rotatable shaft and oppositely disposed from the eccentric shaft, resilient means disposed around the rotatable shaft for urging thereof in a rotational direction against the pull of the cable whereby the braking mechanism will be automatically engaged upon a release of the tension in the cable, and said slack line control sheave responsive to the release of the tension in the cable for automatically stopping the movement of the cable.

References Cited by the Examiner

UNITED STATES PATENTS

| 126,483 | 5/72 | Perkins | 242—156.1 |
| 577,644 | 2/97 | Casey | 254—175 |
| 1,787,516 | 1/31 | Dubuque | 188—65.1 |
| 1,946,920 | 2/34 | Stahl | 254—175 |
| 2,228,346 | 1/41 | Downie | 254—145 |
| 2,462,972 | 3/49 | Johnson | 254—175 |
| 2,555,604 | 6/51 | Pies | 242—84.41 |
| 2,922,599 | 1/60 | Bigelow | 242—158.4 |

FOREIGN PATENTS 138,962   6/30   Switzerland.

SAMUEL F. COLEMAN, *Primary Examiner.*

LEYLAND M. MARTIN, *Examiner.*